US010321340B2

(12) United States Patent
Li

(10) Patent No.: US 10,321,340 B2
(45) Date of Patent: Jun. 11, 2019

(54) COMMUNICATION NETWORK SERVICE CONDITION DETECTION

(71) Applicant: Hughes Network Systems, LLC, Germantown, MD (US)

(72) Inventor: Frank Li, Herndon, VA (US)

(73) Assignee: Hughes Network Systems, LLC, Germantown, MD (US)

( * ) Notice: Subject to any disclaimer, the term of this patent is extended or adjusted under 35 U.S.C. 154(b) by 135 days.

(21) Appl. No.: 14/585,559

(22) Filed: Dec. 30, 2014

(65) Prior Publication Data

US 2016/0191301 A1    Jun. 30, 2016

(51) Int. Cl.
*H04L 12/24* (2006.01)
*H04L 12/703* (2013.01)
*H04W 24/08* (2009.01)
*H04W 72/04* (2009.01)

(52) U.S. Cl.
CPC ............. *H04W 24/08* (2013.01); *H04L 41/04* (2013.01); *H04L 41/0672* (2013.01)

(58) Field of Classification Search
CPC ..... H04W 24/08; H04W 72/04; H04W 84/06; H04L 41/0654; H04L 41/0686; H04L 45/28; H04L 41/0604; H04L 43/0823; H04L 2012/5608; H04L 2012/6421; H04L 29/02
See application file for complete search history.

(56) References Cited

U.S. PATENT DOCUMENTS

| 6,295,615 | B1* | 9/2001 | Cohen | H04J 3/14 714/712 |
| 9,769,015 | B2* | 9/2017 | Suzuki | H04L 41/0668 |
| 2002/0159392 | A1* | 10/2002 | Klipper | H04L 49/102 370/242 |
| 2003/0028817 | A1* | 2/2003 | Suzuyama | H04L 29/1215 714/4.1 |
| 2003/0229807 | A1* | 12/2003 | Qiao | H04L 45/02 726/3 |
| 2004/0172574 | A1* | 9/2004 | Wing | G06F 11/2025 714/4.12 |
| 2005/0013241 | A1* | 1/2005 | Beller | H04J 3/085 370/216 |
| 2005/0198363 | A1* | 9/2005 | Ling | H04W 36/0011 709/236 |
| 2009/0249407 | A1* | 10/2009 | Manne | H04N 21/6181 725/68 |
| 2009/0265587 | A1* | 10/2009 | Yamaguchi | H04L 41/0654 714/48 |

(Continued)

*Primary Examiner* — Hoang-Chuong Q Vu
(74) *Attorney, Agent, or Firm* — Bejin Bieneman PLC

(57) ABSTRACT

A telecommunications system includes a network device that detects a communication failure associated with a first communication network and generates a failure command for a remote device to transmit a failure signal over a second communication network. The failure signal represents the communication failure. A method includes detecting a communication failure associated with a first communication network, generating a failure command for a remote device to transmit a failure signal over a second communication network, and transmitting the failure command to the remote device. The network device may take a corrective action in response to receiving a recovery signal from the remote device.

12 Claims, 2 Drawing Sheets

(56) References Cited

U.S. PATENT DOCUMENTS

| | | | | |
|---|---|---|---|---|
| 2010/0146133 A1* | 6/2010 | Perrin | H04L 51/24 | |
| | | | 709/229 | |
| 2010/0173586 A1* | 7/2010 | McHenry | H04L 27/0006 | |
| | | | 455/62 | |
| 2012/0023361 A1* | 1/2012 | Hammam | H04L 29/12386 | |
| | | | 714/4.11 | |
| 2012/0196618 A1* | 8/2012 | Lowell | H04W 24/08 | |
| | | | 455/456.1 | |
| 2012/0239822 A1* | 9/2012 | Poulson | H04L 41/0668 | |
| | | | 709/239 | |
| 2013/0121683 A1* | 5/2013 | Nagamine | H04L 41/0686 | |
| | | | 398/2 | |
| 2013/0204452 A1* | 8/2013 | Yamaguchi | H04B 3/54 | |
| | | | 700/292 | |
| 2014/0086040 A1* | 3/2014 | Takahashi | H04L 41/0663 | |
| | | | 370/216 | |
| 2015/0201341 A1* | 7/2015 | Nunokawa | H04W 24/08 | |
| | | | 455/67.13 | |
| 2017/0055170 A1* | 2/2017 | Futaki | H04W 24/08 | |
| 2017/0118662 A1* | 4/2017 | Rahman | H04W 24/02 | |

* cited by examiner

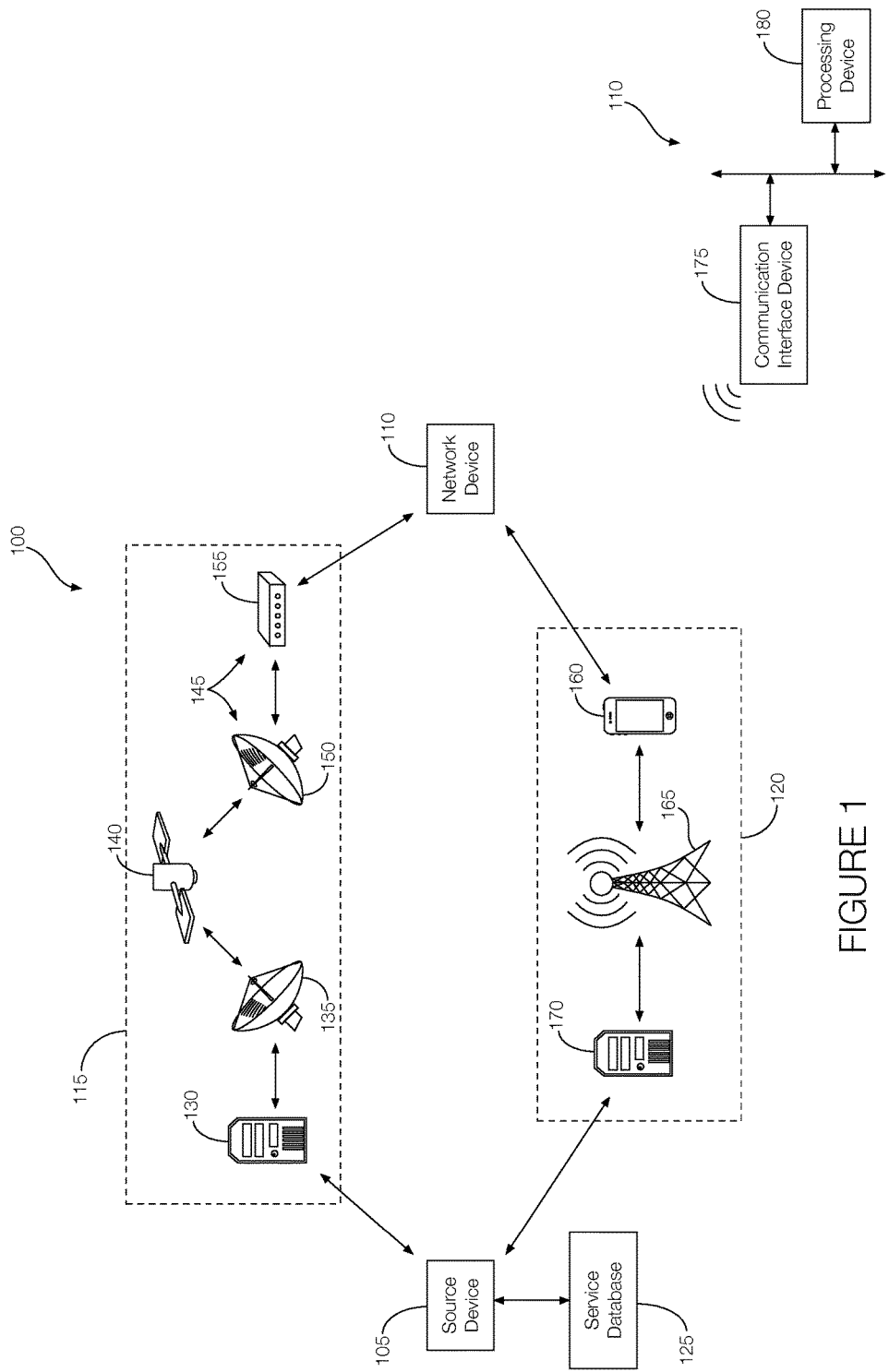

COMMUNICATION NETWORK SERVICE CONDITION DETECTION

BACKGROUND

Communication network failures are often presumed when one network device is unable to establish communication with another network device. Once a network failure is detected, a service technician may be dispatched to manually diagnose and repair the network, the network device, or both. Even though the repair of the network or network device may be relatively quick, dispatching a service technician can take some time.

BRIEF DESCRIPTION OF THE DRAWINGS

FIG. 1 illustrates an example telecommunications system that includes a network device that can detect a failure associated with a first communication network and remedy the failure by sending instructions to the network device over a second communication network.

FIG. 2 is a block diagram showing example components of the network device of FIG. 1.

DETAILED DESCRIPTION

Figure 3:
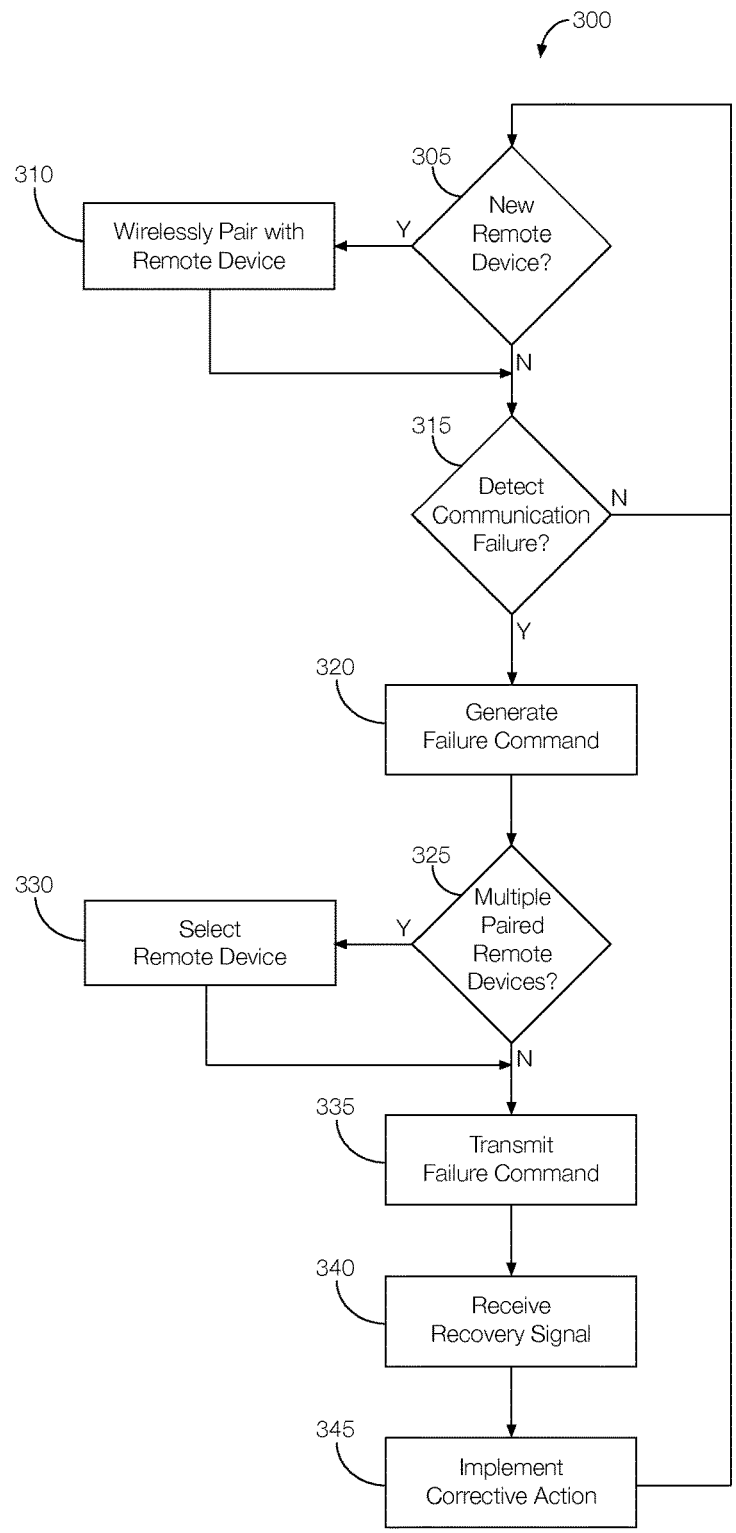
FIG. 3 is a flowchart of an example process that may be executed by the network device to remedy the communication failure associated with the first communication network based on instructions received over the second communication network.

It can be frustrating for customers to wait a day or more for a service technician to be dispatched to the customer's home or business to diagnose and correct a network issue, especially if the customer would have been able to correct the issue herself. Some network repairs are simple and could be performed by a properly informed customer. Moreover, some network devices can be repaired remotely. If communication could be established with the network device, the network device could be, e.g., updated with appropriate software and rebooted.

An example telecommunications system that can present instructions to the customer or attempt to repair the network device directly includes a network device that detects a communication failure associated with a first communication network and generates a failure command for a remote device to transmit a failure signal over a second communication network. The failure signal represents the communication failure. The remote device receives a recovery signal over the second communication network. In some instances, the recovery signal includes instructions for the customer to repair the network device. In other instances, the recovery signal may be transmitted to the network device. In response to receiving the recovery signal, the network device may take a corrective action such as, e.g., downloading and installing a software update, rebooting, or the like.

The elements shown may take many different forms and include multiple and/or alternate components and facilities. The example components illustrated are not intended to be limiting. Indeed, additional or alternative components and/or implementations may be used.

As illustrated in FIG. 1, a telecommunications system 100 includes a source device 105 and a network device 110. The source device 105 and network device 110 are configured to communicate via two network paths—a first communication network 115 and a second communication network 120.

The source device 105 may include any electronic device configured or programmed to transmit and receive messages over the first communication network 115. In some instances, the source device 105 may be configured or programmed to transmit and receive messages according to a first communication protocol. An example of the first communication protocol may include the transmission control protocol (TCP), which is part of the Internet protocol suite.

The source device 105 may include or be in communication with a service database 125. The service database 125 may store records relating network communication failures to possible corrective actions. The corrective actions may include a recommendation for the network device 110 to e.g., download and install a software update, reboot, or the like. In some possible approaches, the corrective action includes instructions for a user to attempt to correct the network communication failure.

The network device 110 may include any electronic device configured or programmed to transmit and receive messages according the first communication protocol. In some possible approaches, the network device 110 may include a modem or router. Moreover, the network device 110 may be further configured or programmed to communicate with the remote device. As discussed in greater detail below, the network device 110 may be configured or programmed to transmit commands to the remote device.

The first communication network 115 may include a satellite communication network. Therefore, the first communication network 115 may include a satellite gateway 130, a network management system 135, a satellite 140, and a satellite receiver 145.

The satellite gateway 130 may include any electronic device configured or programmed to facilitate communication between the source device 105 and the first communication network 115. For example, the satellite gateway 130 may convert messages transmitted from the source device 105 into a format that complies with the first communication protocol. The satellite gateway 130 may transmit signals to, e.g., the network management system 135.

The network management system 135 may include any electronic device configured or programmed to control and monitor communications over the first communication network 115 for, e.g., performance. That is, the network management system 135 may facilitate the transmission of signals to certain satellites 140 as well as determine whether the communications over the first communication network 115 meet certain performance criteria for, e.g., satellite network communications. The network management system 135 may receive signals from, e.g., the satellite gateway 130 and transmit signals to, e.g., one or more satellites 140 in orbit around the Earth.

The satellite 140 may include any device in orbit relative to the Earth and configured to receive and transmit signals. The signals may be received from, e.g., the network management system 135. The satellite 140 may broadcast signals back to Earth to be received by a satellite receiver 145, and in particular, an outdoor unit 150.

The satellite receiver 145 may include an outdoor unit 150 and an indoor unit 155. An example outdoor unit 150 may include a satellite dish configured to receive signals transmitted from the satellite 140 in orbit around the Earth, or vice versa. An example indoor unit 155 may include an electronic device, such as a set-top box or modem. The indoor unit 155 may be configured to receive and process signals from the outdoor unit 150. The processed signals may be transmitted to, e.g., the network device 110, or vice versa.

The second communication network 120 may include a cellular communication network. The second communication network 120, therefore, may include a remote device 160, a cellular network interface 165, and a cellular gateway 170.

The remote device 160 may include any electronic device configured or programmed to receive signals from the network device 110 and transmit signals to the cellular network interface 165 in accordance with a second communication protocol, such as a communication protocol associated with cellular communication. Accordingly, the remote device 160 may include, e.g., a mobile phone or tablet computer. Moreover, the remote device 160 may be programmed to wirelessly pair with the network device 110. While paired, the remote device 160 may receive commands and other signals transmitted from the network device 110, or vice versa.

The cellular network interface 165 may include any device configured or programmed to receive signals from the remote device 160 and transmit signals to the cellular gateway 170 according to the second communication protocol. In one possible implementation, the cellular network interface 165 may include a cell tower.

The cellular gateway 170 may include any electronic device configured or programmed to receive communications from the cellular network interface 165 and convert the communications to messages that comply with a different communication protocol. For example, messages from the cellular network interface 165 may be received at the cellular gateway 170 according to the first communication protocol. The cellular gateway 170 may convert the message to a format that complies with the first communication protocol before transmitting the message to the source device 105.

In one possible implementation, the network device 110 may detect a communication failure associated with the first communication network 115. For instance, the network device 110 may unexpectedly stop receiving messages over the first communication network 115. In response to detecting the communication failure, the network device 110 may be programmed to generate a failure command. The failure command may be transmitted to the remote device 160. The remote device 160 may, in response to receiving the failure command, generate and transmit a failure signal. The failure signal may be transmitted to the source device 105 over the second communication network 120, which is a different type of network than the first communication network 115.

The source device 105 may receive the failure signal over the second communication network 120 and generate a recovery signal. The recovery signal may include instructions for repairing the communication failure. For instance, the failure signal may include diagnostic data provided by the network device 110, and the source device 105 may query the service database 125 in accordance with the diagnostic data. That is, the source device 105 may determine, from the service database 125, corrective actions that may be taken to fix the communication failure. The corrective action may be presented in the form of computer-readable instructions that may be executed by the network device 110, the remote device 160, or both.

The source device 105 may generate the recovery signal and transmit the recovery signal to the remote device 160 over the second communication network 120. In one possible approach, the remote device 160 may simply pass the recovery signal to the network device 110. After receiving the recovery signal, the network device 110 may be programmed to process the recovery signal and take an appropriate corrective action presented by the recovery signal. Examples of corrective actions may include rebooting the network device 110, downloading or installing new software to the network device 110, or the like.

Alternatively, the remote device 160 may present instructions for a user to manually repair the communication network. The instructions may include, e.g., a list of steps for a user to follow. The steps may guide the user through processes such as rebooting the network device 110, downloading and installing new software to the network device 110, or the like.

When the remote device 160 is within wireless range of the network device 110, the network device 110 and the remote device 160 may engage in a handshaking process resulting in the remote device 160 pairing with the network device 110. The first time a remote device 160 pairs with the network device 110, the remote device 160, the network device 110, or both, may need to authorize the pairing. One way to authorize the pairing is for a code to be entered into the network device 110, the remote device 160, or both.

If multiple remote devices 160 are paired with the network device 110, the network device 110 may select which remote device 160 is to transmit the failure signal. The network device 110 may include a priority list of each previously paired remote device 160, and the remote device 160 with the highest priority may be used to transmit the failure signal to the source device 105. Alternatively, one remote device 160 may be selected as the default device for transmitting failure signals. Thus, the network device 110 may only use the default device to transmit failure signal when the default device is paired. The network device 110 and the remote device 160 may pair according to any number of wireless communication protocols such as WiFi or Bluetooth®.

Furthermore, the source device 105 may analyze the data stored in the service database 125 for, e.g., trends associated with network communication failures. The result of analyzing the data may be used to design new network components or proactively push software updates to network components to prevent future occurrences of network failures.

FIG. 2 is a block diagram showing example components of the network device 110 of FIG. 1. As shown, the network device 110 includes a communication interface device 175 and a processing device 180.

The communication interface device 175 may include any electronic device configured to facilitate communication over the first communication network 115, the second communication network 120, or both. For example, the communication interface may be configured to receive signals transmitted over the first communication network 115 in accordance with the first communication protocol and the second communication network 120 in accordance with the second communication protocol. Moreover, the communication interface device 175 may be configured to transmit messages over the first communication network 115 and the second communication network 120, in accordance with the first and second communication protocols, respectively. For example, the communication interface device 175 may be configured to transmit the failure command to, e.g., the remote device 160 over the second communication network 120 and in accordance with the second communication protocol if a communication failure relative to the first communication network 115 is detected. Further, the communication interface device 175 may be configured to wirelessly receive, from the remote device 160, the recovery signal. In some implementations, the communication interface device 175 may initiate a handshake or other pairing technique to pair with the remote device 160 or other wireless communication devices. The communication interface device 175 may be configured to communicate, therefore, in accordance with any number of communication protocols, including wireless communication protocols. Examples of such protocols may include, e.g., Bluetooth® or WiFi. The communication interface device 175 may be further configured to transmit messages internally relative to the network interface device. For instance, the communication interface device 175 may transmit signals to, and receive signals from, the processing device 180 over, e.g., a communication bus or other communication link.

The processing device 180 may include any electronic device programmed to process signals received from the communication interface device 175. Moreover, the processing device 180 may be programmed to detect a communication failure relative to the first communication network 115, the second communication network 120, or both. If a failure of the first communication network 115 is detected, the processing device 180 may be programmed to generate the failure command with instructions for the communication interface device 175 to transmit the failure command to the remote device 160 over the second communication network 120 and in accordance with the second communication protocol. If multiple devices are paired with the network device 110, the processing device 180 may be further programmed to select which of the paired network devices 110 is to transmit the failure command signal. The processing device 180 may command the communication interface device 175 to transmit the failure command to only the selected remote device 160.

The processing device 180 may be further programmed to receive the recovery signal from the communication interface device 175 and process the recovery signal. Processing the recovery signal may include extracting a set of instructions that can be executed by the processing device 180. The instructions may cause the processing device 180, and possibly other components of the network device 110, to carry out a corrective action such as, e.g., downloading and installing a software update, rebooting, or the like.

FIG. 3 is a flowchart of an example process 300 that may be executed by the network device 110 to detect and remedy the communication failure associated with the first communication network 115 based on instructions received over the second communication network 120. The process 300 may begin when the network device 110 is turned on, and portions of the process 300 may continue to execute until the network device 110 is turned off.

At block 305, the network device 110 may determine whether a new remote device 160 has been detected. The new remote device 160 may include a remote device 160 within range of the network device 110. The network device 110 may further determine whether the new remote device 160 has previously been paired with the network device 110. When a new remote device 160 is detected, the process 300 may continue to block 310. Otherwise, the process 300 may proceed to block 315. The processing device 180 may detect whether a new remote device 160 has been detected based on, e.g., signals received from the communication interface device 175.

At block 310, the network device 110 may wirelessly pair with at least one remote device 160. When the remote device 160 is within wireless range of the network device 110, the network device 110 and the remote device 160 may engage in a handshaking process resulting in the remote device 160 pairing with the network device 110. The first time a remote device 160 pairs with the network device 110, the remote device 160, the network device 110, or both, may need to authorize the pairing. One way to authorize the pairing is for a code to be entered into the network device 110, the remote device 160, or both. The communication interface device 175 may facilitate the pairing with the remote device 160.

At block 315, the network device 110 may detect a communication failure associated with the first communication network 115. The communication failure may be detected by, e.g., the processing device 180 or the communication interface device 175. If the communication failure is detected, the process 300 may continue at block 320. Otherwise, the process 300 may return to block 305.

At block 320, the network device 110 may generate the failure command. The failure command may include instructions for the remote device 160 to transmit a failure signal over the second communication network 120. As discussed above, the failure signal represents the communication failure relative to the first communication network 115.

At decision block 325, the network device 110 may determine if multiple remote devices 160 are paired. If so, the process 300 may continue to block 330. Otherwise, the process 300 may continue to block 335. The processing device 180 or the communication interface device 175 may determine whether multiple remote devices 160 are paired.

At block 330, the network device 110 may select one of the paired remote devices 160. The network device 110 may include a priority list of each previously paired remote device 160, and the remote device 160 with the highest priority may be used to transmit the failure signal. Alternatively, one remote device 160 may be selected as the default device for transmitting failure signals. Thus, the network device 110 may only use the default device to transmit failure signals when the default device is paired. The network device 110 and the remote device 160 may pair according to any number of wireless communication protocols such as WiFi or Bluetooth®. The selection of the remote devices 160 may be made by, e.g., the processing device 180 or the communication interface device 175.

At block 335, the network device 110 may transmit the failure command to the selected remote device 160. The failure command may be transmitted to the remote device 160 via, e.g., the communication interface device 175 over the second communication network 120. As discussed above, the failure command may be transmitted in accordance with the second communication protocol.

At block 340, the network device 110 may receive the recovery signal from the remote device 160. The source device 105 may generate the recovery signal and transmit the recovery signal to the remote device 160 over the second communication network 120. In one possible approach, the remote device 160 may simply pass the recovery signal to the network device 110. The recovery signal may be received at the network device 110 via, e.g., the communication interface device 175.

At block 345, the network device 110 may process the recovery signal and implement an appropriate corrective action based on the instructions included in the recovery signal. Examples of corrective actions may include rebooting the network device 110, downloading or installing new software to the network device 110, or the like. The instructions included in the recovery signal may be executed by, e.g., the processing device 180.

The process 300 may end after block 345. Alternatively, the process 300 may continue to block 305 so that the process 300 may run continuously until the network device 110 is turned off.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A telecommunications system comprising:
   a network device programmed to detect a communication failure associated with a first communication network while paired with a remote device,
   wherein the network device is programmed to generate a failure command for the remote device to transmit a failure signal to a source device over a second communication network, wherein the failure signal represents the communication failure between the network device and the source device over the first communication network,
   wherein the network device is programmed to pair with a plurality of remote devices and select at least one of the plurality of remote devices paired with the network device to transmit the failure signal,
   wherein the network device is programmed to receive, from the source device, a recovery signal via the remote device and wherein the network device is programmed to take a corrective action as a result of the network device receiving the recovery signal.

2. The telecommunications system of claim 1, wherein the first communication network includes a satellite communication network and wherein the second communication network includes a cellular communication network.

3. The telecommunications system of claim 1, wherein the network device is programmed to generate the failure command in response to detecting the communication failure.

4. The telecommunications system of claim 1, wherein network device is programmed to wirelessly pair with the remote device.

5. The telecommunications system of claim 1, wherein the recovery signal is transmitted from the source device to the remote device over the second communication network.

6. The telecommunications system of claim 1, wherein the selected remote device transmits the failure signal over the second communication network while paired with the network device.

7. A telecommunications system comprising:
   a source device; and
   a network device in communication with the source device over a first communication network and programmed to detect a communication failure between the source device and the network device over the first communication network,
   wherein a remote device is in communication with the source device over a second communication network, the remote device being programmed to transmit a failure signal to the source device over the second communication network,
   wherein the network device is programmed to transmit a failure command to the source device, via the remote device, the remote device being programmed to:(a) transmit the failure signal over the second communication network to the source device as a result of receiving the failure command, and (b) receive a recovery signal from the source device over the second communication network,
   wherein the source device is programmed to transmit the recovery signal over the second communication network to the remote device after the source device receives the failure signal transmitted from the remote device,
   wherein the network device is programmed to receive the recovery signal from the source device, via the remote device, and take a corrective action in response to receiving the recovery signal,
   wherein the remote device is paired with the network device when the network device detects the communication failure associated with the first communication network and when the remote device transmits the failure signal to the source device over the second communication network,
   wherein the network device is programmed to select the remote device from among a plurality of remote devices.

8. The telecommunications system of claim 7, wherein the first communication network includes a satellite communication network and wherein the second communication network includes a cellular communication network.

9. The telecommunications system of claim 7, wherein the network device is programmed to generate the failure command in response to detecting the communication failure.

10. The telecommunications system of claim 7, wherein network device is programmed to wirelessly pair with the remote device.

11. A method comprising:
    pairing a network device to a plurality of remote devices;
    detecting, via the network device, a communication failure between the network device and a source device over a first communication network;
    selecting at least one of the plurality of remote devices as a selected remote device;
    generating a failure command for the selected remote device to transmit, while paired with the network device, a failure signal to the source device over a second communication network, wherein the failure signal represents the communication failure between the network device and the source device over the first communication network;
    transmitting the failure command to the selected remote device;
    receiving, at the network device, a recovery signal from the source device, via the selected remote device, wherein the selected remote device receives the recovery signal from the source device over the second communication network; and
    implementing, at the network device, a corrective action as a result of receiving the recovery signal at the network device.

12. The method of claim 11, the failure command is generated in response to detecting the communication failure.

* * * * *